(12) United States Patent
Wood

(10) Patent No.: US 11,884,382 B2
(45) Date of Patent: Jan. 30, 2024

(54) WING TIP DEVICE

(71) Applicant: AIRBUS OPERATIONS LIMITED, Bristol (GB)

(72) Inventor: Norman Wood, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 239 days.

(21) Appl. No.: 17/273,912

(22) PCT Filed: Aug. 20, 2019

(86) PCT No.: PCT/GB2019/052333
§ 371 (c)(1),
(2) Date: Mar. 5, 2021

(87) PCT Pub. No.: WO2020/049270
PCT Pub. Date: Mar. 12, 2020

(65) Prior Publication Data
US 2021/0269145 A1 Sep. 2, 2021

(30) Foreign Application Priority Data
Sep. 7, 2018 (GB) ................................. 1814570

(51) Int. Cl.
*B64C 23/06* (2006.01)
*B64C 3/14* (2006.01)

(52) U.S. Cl.
CPC .............. *B64C 23/072* (2017.05); *B64C 3/14* (2013.01); *B64C 2003/146* (2013.01)

(58) Field of Classification Search
CPC ... B64C 23/072; B64C 3/14; B64C 2003/146; B64C 23/069; B64C 3/54; B64C 23/065; Y02T 50/10
See application file for complete search history.

(56) References Cited

U.S. PATENT DOCUMENTS 4,545,552 A * 10/1985 Welles ................... B64C 23/076
244/199.4
5,582,364 A * 12/1996 Trulin ..................... F42B 10/14
244/3.29
(Continued)

FOREIGN PATENT DOCUMENTS

EP 0 782 956 7/1997
GB 2 524 827 10/2015

OTHER PUBLICATIONS

International Search Report and Written Opinion of the ISA for PCT/GB2019/052333 dated Nov. 4, 2019, 18 pages.
(Continued)

*Primary Examiner* — Medhat Badawi
(74) *Attorney, Agent, or Firm* — Nixon & Vanderhye P.C.

(57) ABSTRACT

A wing tip device for a fixed wing aircraft is disclosed having an alular-like projection, a first leading edge region having a first sweep angle, a second leading edge region outboard of the first leading edge region in a spanwise direction and having a second sweep angle greater than the first sweep angle, a third leading edge region outboard of the second leading edge region in the spanwise direction and adjacent a tip end of the wing tip device and having a third sweep angle greater than the first sweep angle. The second leading edge region is adapted to generate a first vortex, and the third leading edge region is adapted to generate a second vortex which builds towards the tip end of the wing tip device.

26 Claims, 8 Drawing Sheets

(56) References Cited

U.S. PATENT DOCUMENTS

| | | | | |
|---|---|---|---|---|
| 5,738,331 | A * | 4/1998 | Woolley | B64C 5/08 244/103 W |
| 5,992,793 | A * | 11/1999 | Perry | B64C 27/463 244/17.11 |
| 6,152,404 | A * | 11/2000 | Flaig | B64C 23/06 244/214 |
| 6,467,732 | B2 | 10/2002 | Tsukahara | B64C 27/463 244/17.11 |
| 6,547,181 | B1 * | 4/2003 | Hoisington | B64C 23/072 244/46 |
| 6,578,798 | B1 * | 6/2003 | Dizdarevic | B64C 23/069 244/35 R |
| 6,607,168 | B1 * | 8/2003 | Cordier | B63H 25/38 244/199.1 |
| 6,827,314 | B2 * | 12/2004 | Barriety | B64C 5/08 244/204.1 |
| 7,070,148 | B2 * | 7/2006 | Wyrembek | B64C 9/323 244/113 |
| 7,246,998 | B2 * | 7/2007 | Kovalsky | B64C 27/473 416/88 |
| 7,475,848 | B2 * | 1/2009 | Morgenstern | B64C 30/00 244/35 R |
| 7,900,876 | B2 * | 3/2011 | Eberhardt | B64C 23/069 244/199.4 |
| 7,900,877 | B1 * | 3/2011 | Guida | B64C 23/065 244/199.4 |
| 7,988,099 | B2 * | 8/2011 | Bray | B64C 13/16 244/199.4 |
| 8,128,035 | B2 * | 3/2012 | Malachowski | B64C 23/069 244/199.4 |
| 8,136,766 | B2 * | 3/2012 | Dennis | B64C 23/069 244/199.4 |
| 8,382,041 | B1 * | 2/2013 | Yechout | B64C 23/069 244/199.4 |
| 8,469,315 | B2 * | 6/2013 | Larssen | B64C 7/00 244/199.4 |
| 8,544,800 | B2 * | 10/2013 | Stuhr | B64C 23/069 244/199.4 |
| 8,651,431 | B1 * | 2/2014 | White | B64C 23/072 244/46 |
| 8,757,555 | B2 * | 6/2014 | Werthmann | B64C 23/072 244/199.4 |
| 8,894,018 | B2 * | 11/2014 | Boer | B64C 23/072 244/199.4 |
| 8,936,219 | B2 * | 1/2015 | Roman | B64C 5/08 244/45 R |
| 8,944,386 | B2 * | 2/2015 | Gratzer | B64C 23/069 244/45 R |
| 9,033,282 | B2 * | 5/2015 | Wright | B64C 23/069 244/45 R |
| D732,657 | S * | 6/2015 | Peterson | D23/413 |
| 9,162,755 | B2 * | 10/2015 | Guida | B64C 13/16 |
| 9,211,946 | B2 * | 12/2015 | Good | B64C 3/56 |
| 9,290,260 | B2 * | 3/2016 | Lassen | B64C 3/56 |
| 9,296,469 | B2 * | 3/2016 | Santini | B64C 3/56 |
| 9,302,766 | B2 * | 4/2016 | Gratzer | B64C 23/069 |
| 9,381,999 | B2 * | 7/2016 | Gratzer | B64C 23/069 |
| 9,415,857 | B2 * | 8/2016 | Fox | B64C 3/56 |
| 9,452,825 | B2 * | 9/2016 | Witte | B64C 5/08 |
| 9,469,392 | B2 * | 10/2016 | Fox | B64C 3/56 |
| 9,499,252 | B2 * | 11/2016 | Lassen | B64C 3/56 |
| 9,499,255 | B2 * | 11/2016 | Chaussee | B64C 23/072 |
| 9,511,850 | B2 * | 12/2016 | Zaman | B64F 5/50 |
| 9,567,066 | B2 * | 2/2017 | Guida | B64C 13/16 |
| 9,714,080 | B2 * | 7/2017 | Bradshaw | B64C 23/076 |
| 9,764,825 | B2 * | 9/2017 | Guida | B64C 23/065 |
| 10,106,247 | B2 * | 10/2018 | Gratzer | B64C 23/069 |
| 10,137,977 | B2 * | 11/2018 | Thompson | B64C 23/072 |
| 10,252,793 | B2 * | 4/2019 | Gratzer | B64C 23/069 |
| 10,407,181 | B2 * | 9/2019 | Grubb | B64C 39/024 |
| 10,421,529 | B2 * | 9/2019 | Napier | B64C 3/185 |
| 10,562,613 | B2 * | 2/2020 | Guida | B64C 23/076 |
| 10,597,140 | B2 * | 3/2020 | Thompson | B64C 3/58 |
| 10,625,847 | B2 * | 4/2020 | Dhandhania | B64C 23/069 |
| 10,696,387 | B2 * | 6/2020 | Allen | B64C 27/463 |
| 10,745,113 | B2 * | 8/2020 | Chaussee | B64C 3/56 |
| 10,752,338 | B2 * | 8/2020 | Kelly | B64C 23/072 |
| 10,767,682 | B2 * | 9/2020 | Leon | F16B 41/002 |
| 10,781,789 | B2 * | 9/2020 | Church | F03D 1/0675 |
| 10,906,630 | B2 * | 2/2021 | Randall | B64C 3/56 |
| 11,027,819 | B2 * | 6/2021 | Dege | B64C 13/16 |
| 11,052,990 | B2 * | 7/2021 | Bishop | B64C 3/56 |
| 11,192,630 | B2 * | 12/2021 | Bishop | B64C 3/26 |
| 11,214,353 | B2 * | 1/2022 | Dege | B64C 3/56 |
| 11,279,469 | B2 * | 3/2022 | Petscher | B64C 23/069 |
| 11,305,865 | B2 * | 4/2022 | Lorenz | B64C 3/56 |
| 11,312,481 | B2 * | 4/2022 | Petscher | B64C 3/10 |
| 11,319,054 | B2 * | 5/2022 | Weder | B64C 3/56 |
| 11,370,526 | B2 * | 6/2022 | Lorenz | B64C 13/28 |
| 11,396,368 | B2 * | 7/2022 | Petscher | B64C 23/072 |
| 11,420,723 | B2 * | 8/2022 | Bishop | B64C 23/072 |
| 11,427,307 | B2 * | 8/2022 | Petscher | B64C 23/069 |
| 11,440,638 | B2 * | 9/2022 | Lorenz | B64C 3/56 |
| 11,511,851 | B2 * | 11/2022 | Gratzer | B64C 3/10 |
| 2003/0106961 | A1 * | 6/2003 | Wyrembek | B64C 23/076 244/113 |
| 2005/0133672 | A1 * | 6/2005 | Irving | B64C 23/072 244/201 |
| 2008/0042013 | A1 * | 2/2008 | Shmilovich | B64C 23/065 244/199.4 |
| 2010/0044501 | A1 * | 2/2010 | Silich | B64C 15/14 244/52 |
| 2010/0213309 | A1 * | 8/2010 | Parks | B64C 3/16 244/46 |
| 2012/0091262 | A1 * | 4/2012 | Rawdon | B64C 23/069 244/199.4 |
| 2014/0117166 | A1 * | 5/2014 | Campbell, Jr | B29C 70/00 244/199.4 |
| 2015/0042521 | A1 * | 2/2015 | Hazen | B64C 23/069 343/705 |
| 2015/0048215 | A1 * | 2/2015 | McGinnis | B64C 23/069 244/90 R |
| 2015/0360765 | A1 * | 12/2015 | Bradshaw | B64C 5/08 244/45 R |
| 2016/0009378 | A1 * | 1/2016 | Guida | B64C 23/072 244/199.4 |
| 2016/0144951 | A1 * | 5/2016 | Zaman | B64C 23/065 244/199.4 |
| 2017/0113780 | A1 * | 4/2017 | Boye | B64C 23/072 |
| 2017/0190410 | A1 * | 7/2017 | Good | B64C 9/24 |
| 2020/0017200 | A1 * | 1/2020 | Wood | B64C 23/069 |
| 2021/0269145 | A1 * | 9/2021 | Wood | B64C 23/072 |

OTHER PUBLICATIONS

Swatton, "The Principles of Flight for Pilots", John Wiley & Sons Ltd., Chichester, West Sussex, United Kingdom, XP002794678, 5 pages, 2011.

* cited by examiner

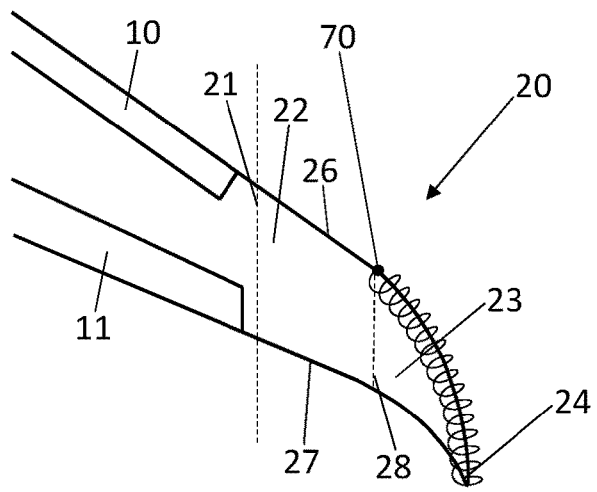
FIG. 3
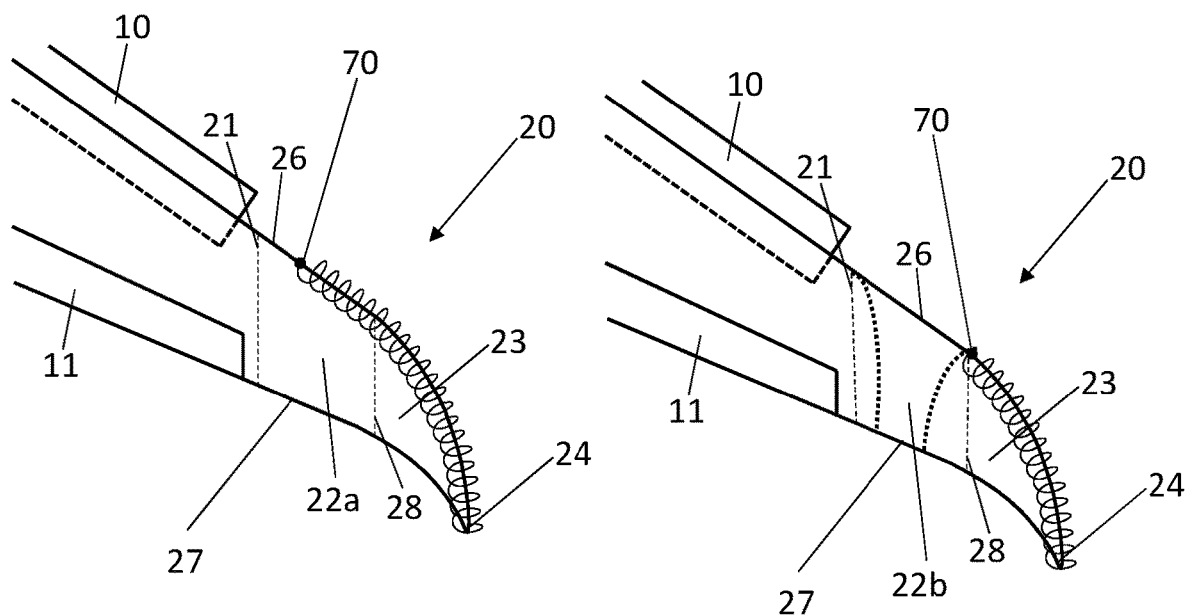
FIG. 4aFIG. 4b

WING TIP DEVICE

CROSS REFERENCE TO RELATED APPLICATIONS

The present application is a National Phase of International Application Number PCT/GB2019/052333 filed Aug. 20, 2019, which designated the U.S. and claims priority benefits from Great Britain Application Number GB 1814570.6 filed Sep. 7, 2018, the entire contents of each of which are hereby incorporated by reference.

FIELD OF THE INVENTION

The present invention relates to a wing tip device for a fixed wing aircraft, and to a wing having the wing tip device.

BACKGROUND OF THE INVENTION

Aircraft wings develop wing tip vortices, so-called trailing or lift-induced vortices. Wing tip devices, such as winglets and raked wing tips, are commonly used on fixed wing aircraft to improve aerodynamic efficiency by reducing drag caused by these wing tip vortices. They function primarily by recovering some of the wing tip vortex energy. They also increase the effective aspect ratio of the wing without significantly increasing wingspan, which avoids an increase in parasitic drag and enables operators to meet span constraints such as airport gate limits.

When viewed in planform, the wing tip vortex can be seen to build from a point on the wing tip device leading edge, extending rearwardly around the wing tip device leading edge towards the tip of the wing tip device. At low subsonic speeds, as the angle of attack increases, the nascent point of the wing tip vortex can travel inboard along the leading edge of the wing tip device. Leading edge high lift devices, such as slats, Krueger flaps, etc. will typically prevent the inboard advance of the vortex.

For an aircraft wing with a short spanwise wing tip device this inboard advance of the nascent point of the wing tip vortex is short and is inherently limited by the leading edge high lift device. However, for an aircraft wing with a longer spanwise wing tip device there can exist a relatively large spanwise region of unprotected (no high lift devices) thin aerofoil. This thin aerofoil region may be susceptible to leading edge flow separation and minor surface discontinuities such as dirt, insect debris, joints, light fittings etc. may be sufficient to prevent the inboard advance of the tip vortex. If the tip vortex is prevented from advancing, leading edge flow separation may occur in this region. Leading edge flow separation is typically sudden and causes a correspondingly sudden increase in drag. It has been shown that the flow separation from this area gives rise to a significant increase in aircraft drag that is penalising both on take-off performance and potentially on lateral handling qualities.

Moreover, this leading edge flow separation can be highly unpredictable and can exhibit significant hysteresis, and given the significant effect this has on drag, the change in drag becomes similarly unpredictable. The inboard movement of the tip vortex that can prevent this leading edge flow separation but which movement can be impeded by the minor surface discontinuities, can quickly jump inboard and outboard with only minor changes in the angle of attack especially in a region of straight leading edge.

If this flow separation could be better predicted and managed such that it resulted in a lower drag penalty and more benign characteristics the benefits would be appreciable.

SUMMARY OF THE INVENTION

A first aspect of the invention provides a wing tip device, or a wing having a wing tip device, for a fixed wing aircraft, comprising a first leading edge region having a first sweep angle, a second leading edge region outboard of the first leading edge region in a spanwise direction and having a second sweep angle greater than the first sweep angle, a third leading edge region outboard of the second leading edge region in the spanwise direction and adjacent a tip end of the wing tip device, and having a third sweep angle greater than the first sweep angle, wherein the second leading edge region is adapted to generate a first vortex, and wherein the third leading edge region is adapted to generate a second vortex which builds towards the tip end of the wing tip device.

A second aspect of the invention provides a wing tip device, or a wing having a wing tip device, for a fixed wing aircraft having an alular-like projection.

In nature, alular refers to the small projection on the anterior edge of bird wings known to assist the flight of birds at slow speed and high angles of attack. The alular, also referred to as an alula or bastard wing, is typically formed of a small bone with two to six feathers attached. It is located at the 'wrist' joint between the arm-wing and hand-wing of a bird and is essentially a birds 'thumb'. The alular can be extended forwards to produce a slot behind it, and is thought to form a small vortex that forces the airflow over the wing to better attach to it.

Here, the term 'alular-like projection' refers to a projection forward from the leading edge of the wing tip device.

The alular-like projection may define a convex region with a distinct crest or cusp when viewed in planform. A convex region may refer to a smooth forwardly projecting curved edge, or an apex of a forwardly projecting polygon edge.

The lateral facing edges of the convex region may have a sweep angle with respect to the wing spanwise direction that is at least 35 degrees. The alular-like projection may be adapted to generate two discrete vortices, one inboard of the other. Such vortices may be due to the lateral facing edges of the convex region having a sweep angle of at least 35 degrees. The second, outboard, vortex may build towards a tip end of the wing tip device.

As used here, the term 'planform' refers to the projection of the wing when viewed along the aircraft vertical (z-axis), perpendicular to the wing spanwise direction (y-axis) and perpendicular to the aircraft longitudinal direction (x-axis).

The invention is advantageous in that the previously unpredictable wing tip vortex (at low speed, high angle of attack), that is hard to predict/manage and can be enable leading edge flow separation with a significant and sudden increase in drag, is avoided and replaced with two vortices that are stabilized at a given location. This allows the flow to be better predicted and managed, resulting in a lower drag penalty and more benign flow characteristics at high angles of attack (alpha).

Changes in the planform shape of the wing tip device are achievable without considerable increase in cost or complexity for either the wing tip device, or the wing or aircraft as a whole.

The first, second and third leading edge regions may be located along a single line when the wing tip device is viewed in the aircraft longitudinal direction (x-axis, fore-aft direction).

Single line refers to a line that may be straight, curved and/or include one or more sharp apexes or kinks. The single line may include additional regions between the first, second and third leading edge regions.

The first vortex and the second vortex may rotate in opposing directions. The second vortex may travel towards a trailing edge of the wing tip device. The first vortex and second vortex may be discrete vortices. The first vortex may travel inboard and interact positively with the inboard flow.

The first leading edge region and second leading edge region may be opposing, i.e. facing towards one another.

The first leading edge region may be substantially straight.

The first sweep angle may be at least 20 degrees. Preferably the first leading edge region is swept aft. This may be particularly well suited for a swept wing transonic aircraft. The first leading edge region may have the same sweep angle as the leading edge of the wing to which the wing tip device is attached.

The invention is particularly advantageous for a swept wing, typically found on transonic aircraft.

The second sweep angle may be at least 35 degrees, and/or the third sweep angle may be at least 35 degrees. The second and/or third sweep angle may be at least 40 degrees, or at least 45 degrees. Below 35 degrees, the leading edge sweep may be insufficient to generate the stable vortex required.

The second sweep angle and/or third sweep angle may be at least 10 degrees greater than the first sweep angle. The second sweep angle and/or third sweep angle may alternatively be at least 20 degrees greater than the first sweep angle.

The second sweep angle may be different to the third sweep angle. The second leading edge region may be forward swept. The third leading edge region may be aft swept.

The chord length of the wing tip device in the second leading edge region may increase in the outboard spanwise direction.

The chord length of the wing tip device in the third leading edge region may decrease in the outboard spanwise direction.

Whilst the alular-like projection is designed primarily for low speed, high alpha conditions, if it is a fixed feature of the wing tip device then aerodynamic performance and characteristics at high speed, low alpha conditions requires consideration. Especially in the case of a high subsonic or transonic aircraft, the effect of the alular-like projection on the shock at high subsonic, transonic or supersonic speeds may promote further changes to the wing tip device, especially at the trailing edge.

A trailing edge of the wing tip device may include a convex portion. A convex portion refers to a smooth rearwardly projecting curve as viewed looking forward from the rear of the aircraft along the x-axis. The convex portion may be at substantially the same spanwise location as the second and/or third leading edge regions. The second and/or third leading edge regions may cause the shock to form at a more forward location, and so the convex portion extends the trailing edge rearwards in order to manage the shock locus.

The second leading edge region may be inboard of the tip end of the wing tip device in the spanwise direction so that the second leading edge region does not form a part of the tip end of the wing tip device.

The second leading edge region may be blended into the first leading edge region.

The second leading edge region may extend up to the third leading edge region. The first leading edge region, second leading edge region, and third leading edge region may be contiguous.

The second leading edge region and the third leading edge region may meet to form a sharp leading edge cusp. Cusp refers to a pointed end where second leading edge region and the third leading edge region meet. The two regions may be curved or substantially straight.

The second leading edge region and the third leading edge region may meet to form a smooth leading edge crest.

The crest or cusp may project forward along the longitudinal axis of the aircraft. The crest or cusp may be the forward-most point of the second and third leading edge regions.

The second leading edge region and the third leading edge region may be separated, e.g. by a notched or re-entrant leading edge region. The notched/re-entrant leading edge region between the second leading edge region and the third leading edge region may transition sharply so that an angle is formed at the apex of the second and third leading edge regions. The transition between the notched/re-entrant leading edge region and the second leading edge region may alternatively be a smooth transition. The transition between the re-entrant leading edge region and the third leading edge region may alternatively be a smooth transition.

A lower aerodynamic surface of the aerofoil section of the wing tip device and/or wing may include a concave portion adjacent the leading edge, in particular adjacent the third leading edge region. The concave portion increases the aerofoil camber by producing a nose droop in the aerofoil section that ensures smooth surface flow and ensures that the air flow separates at a predetermined angle of attack at low speed and high alpha.

The concave portion on the lower aerodynamic surface may be forward of the mid-chord line of that aerofoil section. It may preferably be forward of the quarter-chord line of that aerofoil section.

The concave portion of the lower aerodynamic surface may be provided in an aerofoil section that includes the second leading edge region or the third leading edge region.

The second leading edge region and/or the third leading edge region may be moveable between a retracted and a deployed state. In this context this means that the second and/or third leading edge region may be actuated to move relative to the remainder of the wing tip device to which it is attached. This may result in the second sweep angle and/or third sweep angle increasing or decreasing during flight. The actuation may be driven by an actuator, such as a linear actuator, rotary actuator, or other suitable actuator.

The second and/or third leading edge regions may be fixed. This means that they may be non-movable with respect to the remainder of the wing tip device, so that the second and/or third leading edge region is not actuated to move relative to the remainder of the wing tip device to which it is attached.

The wing tip device may further comprises a downlet i.e. a downwardly depending winglet.

The first leading edge region may be devoid of any leading edge high lift devices.

The wing may have a root end, a tip end and a leading edge high lift device extending outboard in the spanwise direction up to adjacent the tip end of the wing.

The wing may have a root end and a tip end and the wing tip device may be coupled to the tip end of the wing. The wing may have a hinge intermediate the root end and the tip end for folding the tip end of the wing.

BRIEF DESCRIPTION OF THE DRAWINGS

Embodiments of the invention will now be described with reference to the accompanying drawings, in which:

FIG. 3 is a plan view of an existing wing tip device with leading edge vortex;

FIG. 4a is a plan view of an existing wing tip device with advancing leading edge vortex moving ideally, and FIG. 4b shows the same wing tip device with the leading edge vortex impinged causing leading edge flow separation;

DETAILED DESCRIPTION OF EMBODIMENT(S)

Figure 1:
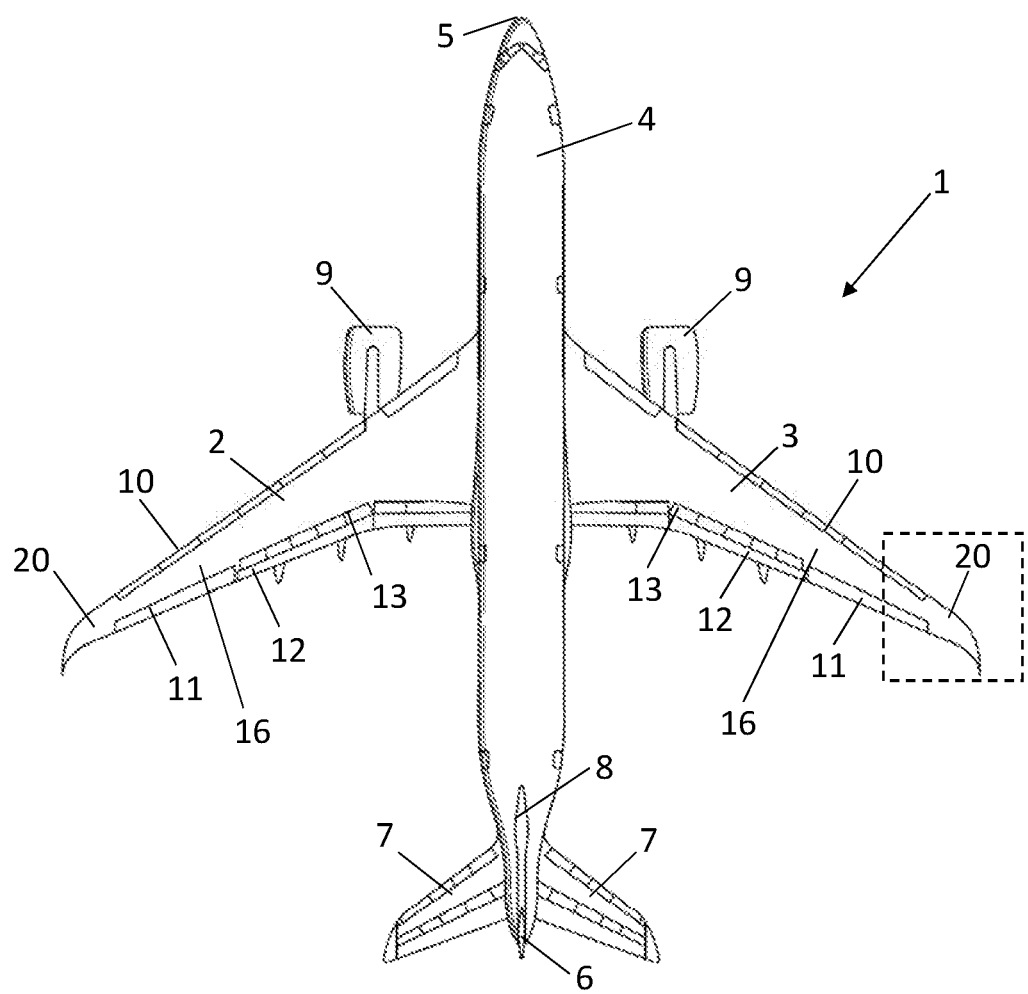
FIG. 1 is a plan view of an aircraft.

FIG. 1 shows an existing aircraft 1 with port and starboard fixed wings 2, 3, engines 9, a fuselage 4 with a nose end 5 and a tail end 6, the tail end 6 including horizontal and vertical stabilising surfaces 7, 8. The aircraft 1 is a typical jet passenger transonic transport aircraft but the invention is applicable to a wide variety of fixed wing aircraft types, including commercial, military, passenger, cargo, jet, propeller, general aviation, etc. with any number of engines attached to the wings or fuselage.

Each wing 2, 3 of the aircraft 1 has a cantilevered structure with a length extending in a span-wise direction from a root to a tip, the root being joined to the aircraft fuselage 4. At the tip of each wing 2, 3 is a wing tip device 20 outboard of a main wing portion 16. The wings 2, 3 are aft swept and have a number of flight control surfaces. Adjacent to the leading edge of the wings 2, 3 are slats 10 distributed along the span of the wings, ailerons 11 are provided on an outboard section of the trailing edge of the wings, the trailing edge of the wings 2, 3 also have flaps 12, and air brakes/spoilers 13 are provided across the upper surface of the wing 3 towards the trailing edge.

Figure 2:
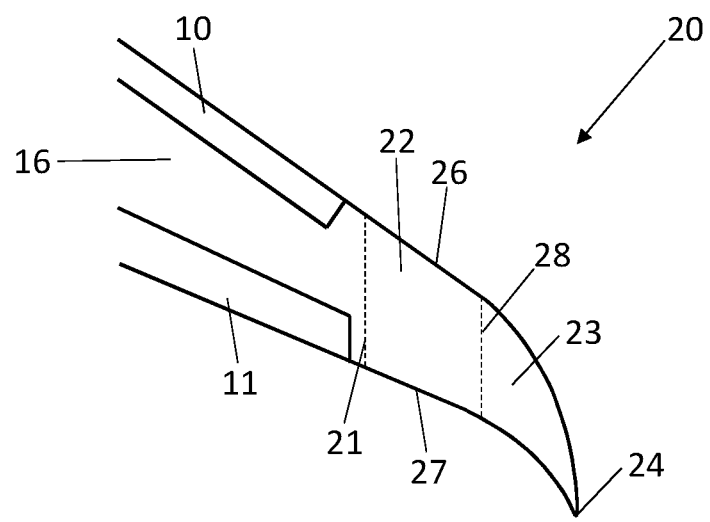
FIG. 2 is a plan view of an existing wing tip device on a starboard wing.

The invention particularly relates to the wing tip devices 20. As the wings 2, 3 are similar in construction, only the wing tip device 20 of the starboard wing 3 will be described in detail with reference to FIG. 2.

The wing tip device 20 includes a root end 21 having an attachment portion which is attached to the outboard end of the main wing portion 16, a winglet 23 that extends outboard to a tip end 24, and a wing tip region 22 extending between the root end 21 of the wing tip device 20 and the inboard edge 28 of the winglet 23.

The wing tip region 22 includes a leading edge 26 and a trailing edge 27. The leading edge 26 and trailing edge 27 are shown to continue the leading and trailing edge profiles of the main wing portion 16, respectively, so that the sweep angle of the wing tip region 26 is substantially the same as the main wing portion 16. The wing is tapered so the chord length of the wing decreases from wing root to tip so that the volume of the wing 3 also decreases from wing root to tip.

The main wing portion 16 includes control surfaces 10, 11 on the leading and trailing edges adjacent to the wing tip region 22, however limited space in the wing tip region 22 makes it difficult to include control surfaces further outboard. The leading edge 26 and trailing edge 27 are therefore straight and clean aerodynamic surfaces.

At low subsonic speeds spanwise flow is induced to travel outboard along the swept wing 3. The spanwise flow feeds the wing tip vortex 70 (shown in FIG. 3) near the wing tip device tip 24 that builds along the leading edge of the winglet 23 towards the tip 24.

As shown in FIG. 4a, as the angle of attack is increased at low subsonic speeds, the leading edge slat 10 can be actuated from an non-deployed phase (FIG. 3) to a deployed phase (FIG. 4a) in order to increase the camber of the aerofoil and to keep the air flow attached. The vortex 70 ideally would progress as shown in FIG. 4a around the leading edge extending inboard to the straight leading edge region towards the leading edge slat 10. If the vortex 70 progresses in this way then the unprotected wing tip region 22a has the vortex 70 at the leading edge 26 and leading edge flow separation is largely avoided.

However, FIG. 4b shows the same wing and wing tip device combination in a more typical high alpha scenario whereby the inboard advance of the tip vortex 70 is inhibited by a surface discontinuity such as dirt, debris, a joint or the like. In this case the unprotected leading edge 26 can lead to leading edge flow separation for the wing tip region 22b.

The onset of leading edge flow separation causes flow separation over the whole portion of the wing tip region 22b demarked with dotted lines, thereby significantly reducing the effective lifting surface of the aircraft.

As a result, there is a significant drag penalty and a significant section of the wing 3 is unable to generate lift. The unstable advance of the vortex 70 and sudden onset of leading flow separation may also occur asymmetrically between the port 2 and starboard 3 wings, which could affect the lateral handling qualities of the aircraft 1.

The critical angle of attack and the location of the vortex 70 and ensuing leading edge flow separation is difficult to predict, so the performance envelope of the aircraft may need to be reduced in order to avoid the critical angle of attack, as explained with reference to FIG. 5.

Figure 5:
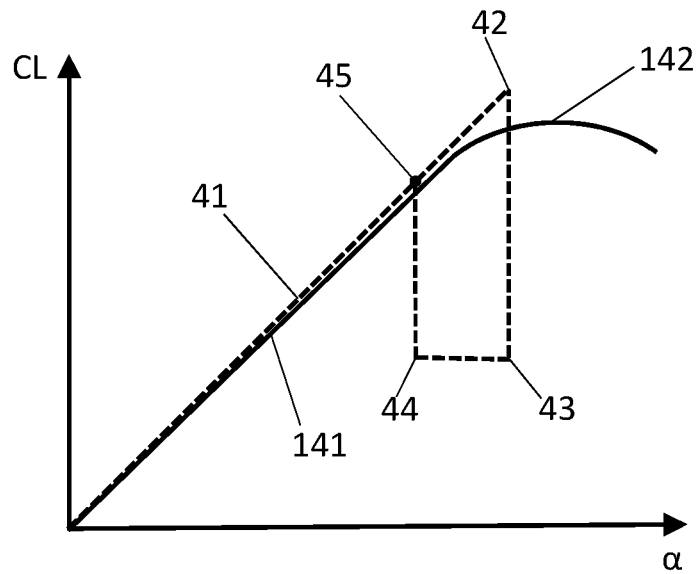
FIG. 5 shows the lift slope for the wing tip device with and without an alular-like projection.

The dotted line 41 of FIG. 5 shows the effect of this flow separation on the lift coefficient CL as the angle of attack, alpha, is increased. The lift coefficient CL increases linearly with alpha up to a maximum lift coefficient 42, which corresponds to the critical angle of attack at which the leading edge flow separation occurs over the wing tip region 22*b*.

Any further increase in alpha beyond the maximum lift coefficient 42 would causes the lift coefficient CL to suddenly drop, 43, which would cause the wing tip region 22 to partially or fully stall. The aircraft 1 would then need to pitch nose down to reduce the alpha, 44, so that the aircraft 1 could recover the stalled portion of the wing tip region. Note the significant hysteresis in the CL-alpha curve in FIG. 5.

As the critical angle of attack is difficult to predict, the recovery point 45 on the lift slope is used to define the maximum angle of attack of the aircraft 1 to safely avoid the wing tip region stall condition. The consequence is that a portion of the potential aircraft performance envelope is unusable.

Figure 6:
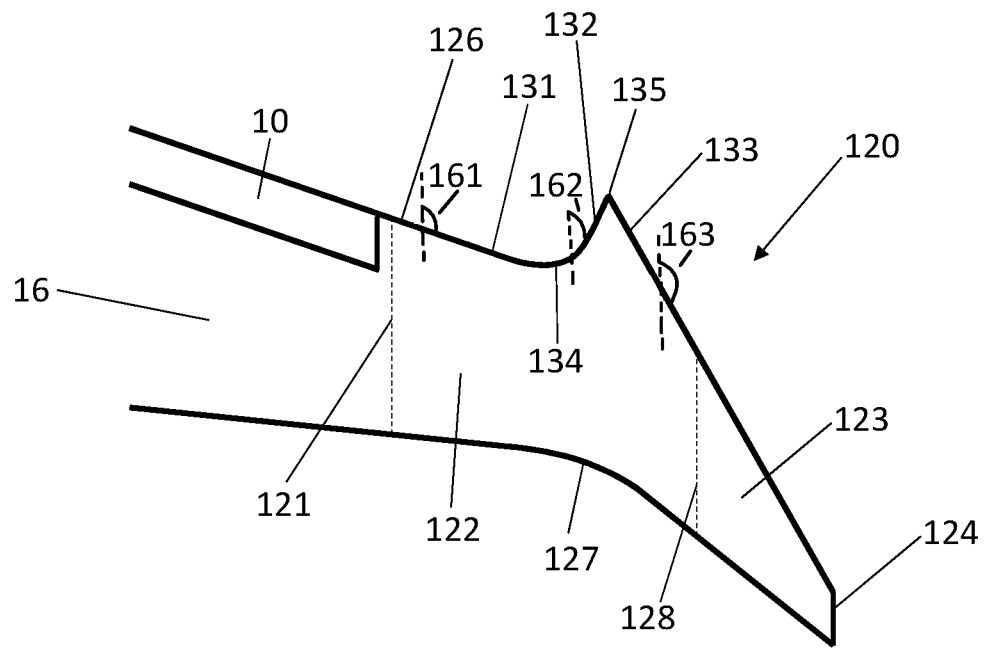
FIG. 6 is a plan view of a first example of the wing tip device having the alular-like projection.

FIG. 6 shows a first example of the wing tip device having an alular-like projection. The wing tip device 120 is similar to the existing wing tip devices 20 described above in relation to FIGS. 1 to 4, except that the leading edge of the wing tip device 120 is configured to generate two counter rotating vortices either side of the alular-like projection.

The wing tip device 120 includes a root end 121 adjacent to a main wing portion 116, a winglet 123, and a wing tip region 122 extending between the root end 121 and the winglet 123. The main wing portion 16 includes a leading edge slat 10 adjacent to the wing tip region 22. The leading edge of the wing tip device 120 includes three leading edge regions 131, 132, 133.

A first leading edge region 131 is adjacent to the root end 121 of the wing tip device 120. The first leading edge region 131 is substantially straight, and swept aft at a first sweep angle of approximately 30 degrees.

A second leading edge region 132 extends from the first leading edge region 131. The second leading edge region 132 is forward swept at a second sweep angle of 60 degrees, so that an angle of approximately 90 degrees is formed between the first 131 and second 132 leading edge regions. The junction 134 between the first 131 and second 132 leading edge regions is blended so that the angle between the first 131 and second 132 leading edge regions is transitioned gradually to form a smooth profile that reduces drag. The second leading edge region 132 is configured so that all of the second leading edge region 132 is forward of the outboard tip of the first leading edge region 131.

A third leading edge region 133 extends from the second leading edge region 132. The third leading edge region 133 is swept aft at a third sweep angle of 60 degrees, so that an angle of 60 degrees is formed between the second 132 and third 133 leading edge regions. The third leading edge region 133 extends towards the tip end 124 of the wing tip device. The second 132 and third 133 leading edge regions meet to form a sharp leading edge cusp 135.

At low speed and high angle of attack, the sharp leading edge cusp 135 formed by the second 132 and third 133 leading edge regions splits the air flow and generates two strong, stable vortices 173, 174.

Figure 7:
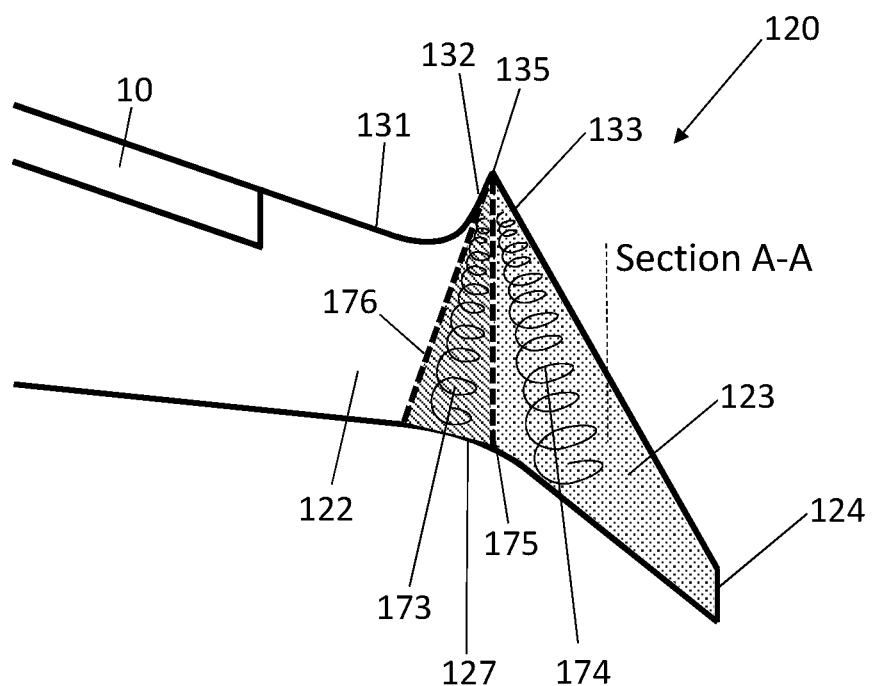
FIG. 7 is a plan view of the wing tip device of FIG. 6 showing the formation of the two vortices.

A first vortex 173 is generated at the second leading edge region 132 that travels slightly inboard and towards the trailing edge 127, within the area generally defined by dotted lines 175 & 176 (see FIG. 7). The first vortex 173 energises the flow so that it remains attached to the wing 3, and interacts positively with the flow emanating from the leading edge slat 10 and does not cause unstable flow separation.

A second vortex 174 is generated at the third leading edge region 133 and travels towards the tip end 124 of the winglet 123, within the area generally defined between the dotted line 175 and the tip end 124. The second vortex 174 builds as the wing tip vortex, whilst the shape of the leading edge cusp 135 ensures that the tip vortex does not travel further inboard than the leading edge cusp 135.

The first and second vortices 173, 174 are stable, although the first vortex 173 is weaker than the second vortex 174 due to the smaller size of the second leading edge region 132 in comparison to the third leading edge region 133. The location of the vortices 173, 174 is predetermined by the location of the alular-like projection formed by the second and third leading edge regions 132, 133, making the flow behaviour easier to predict and manage.

The effect of the planform change by the inclusion of the alular-like projection is a small drag penalty, particularly when the vortices are generated at relatively low angles of attack. This is preferable to the large and sudden increase in drag that occurs at a critical angle of attack on existing wing tip devices (as described in relation to FIGS. 1 to 4).

The lift slope 141 of the wing tip device is shown in FIG. 5. The effect of the alular-like projection is to produce a benign stall of the wing tip region. Increase of the angle of attack beyond the angle at which the maximum lift 142 occurs is accompanied a gradual stall without hysteresis whose behaviour is more predictable and more manageable, so that the performance envelope of the aircraft can be increased.

The location of the alular-like projection is a trade-off between the proportion of the main wing leading edge that is protected, and the proportion of the main wing and/or wing tip region that incurs the drag penalty due to the alular-like projection at relative low alpha.

Figure 8:
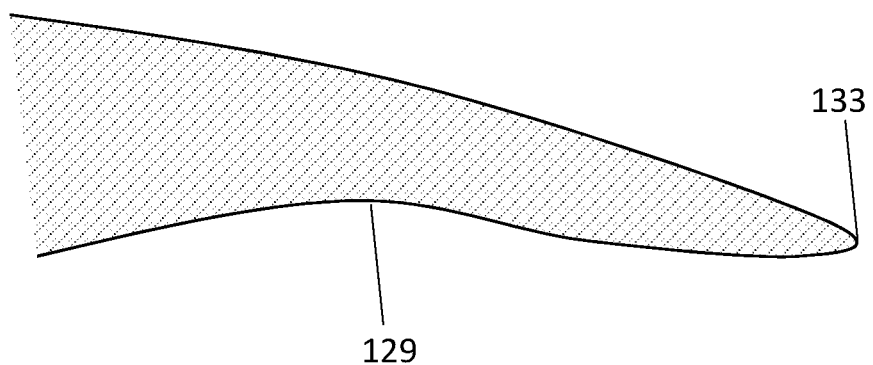
FIG. 8 is a profile view of the leading edge of the aerofoil section A-A of FIG. 7.

FIG. 8 shows a cross-section of the third leading edge region 133 indicated by the section line A-A on FIG. 7. The aerofoil shape of the third leading edge region 133 is designed to include a sharp nose profile and a droop in the nose such that the lower aerodynamic surface includes a concave portion 129 adjacent to the third leading edge region 133. The second leading edge region 132 is also shaped to include the sharp nose profile and droop in the nose as described for the third leading edge region 133, such that the lower aerodynamic surface includes a concave portion 129 adjacent to the second leading edge region 132. This allows the angle of attack at which the vortices 173, 173 occur to be predetermined.

Figure 9:
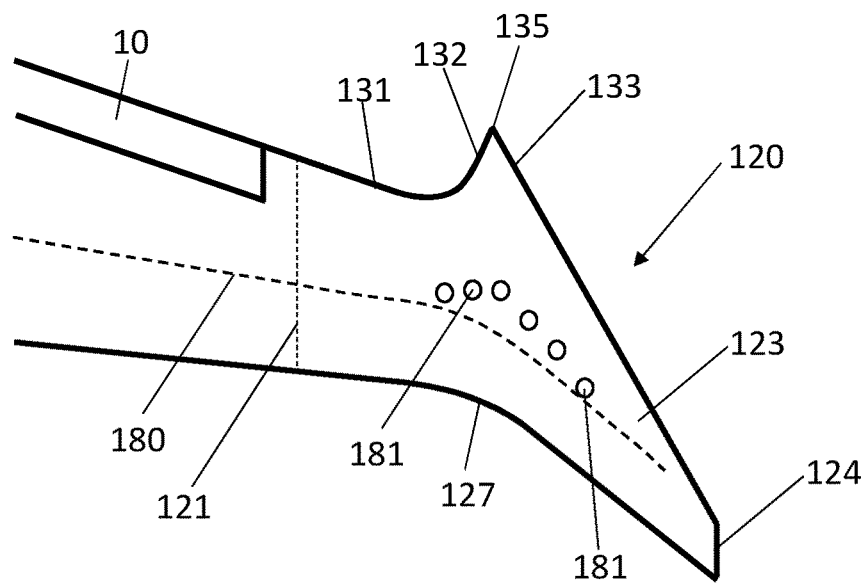
FIG. 9 is a plan view of the wing tip device of FIG. 6 indicating the shock locations at high speed.

At higher transonic speeds, the effect of the planform change alters the location of the shock 181 to bring the shock forward from its original position 180 (See FIG. 9).

Figure 10:
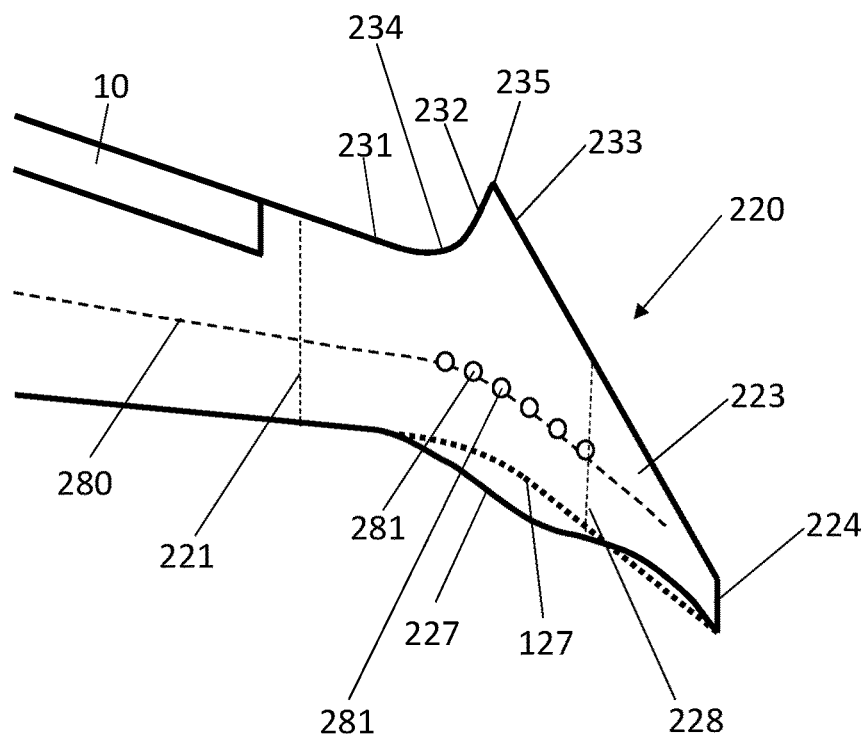
FIG. 10 is a plan view of a second example of the wing tip device having a modified trailing edge.

A second example of the wing tip device is shown in FIG. 10. Like reference numerals are used to denote like parts with the first example, and similar reference numerals but numbered in the 200 series are used to denote similar parts with the first example. The second example is substantially the same as the first example except that the trailing edge is modified. The trailing edge 227 is modified to counteract the forward movement of the shock 281 so that the shock locations 281 in the vicinity of the alular-like projection are moved aft. The unmodified trailing edge of the first example is shown as dotted line 127.

The trailing edge 227 is modified to have a more rearward trailing edge portion than in the first example at approximately the same spanwise location as the alular-like projection formed by the second and third leading edge regions 232, 233, so that as the second leading edge region 232 projects forward towards the sharp cusp 135 the trailing edge projects rearwards, and as the third leading edge region 233 sweeps aft the trailing edge projects forwards. This thereby forming a convex region on the trailing edge 227 of the wing 3 at approximately the same location as the second 232 and third 233 leading edge regions. Further outboard from the convex region the trailing edge moves forward as compared with the first example, and then is coincident at the tip 224. The trailing edge 227 has an inflection, or sigmoid, planform shape.

Figure 11:
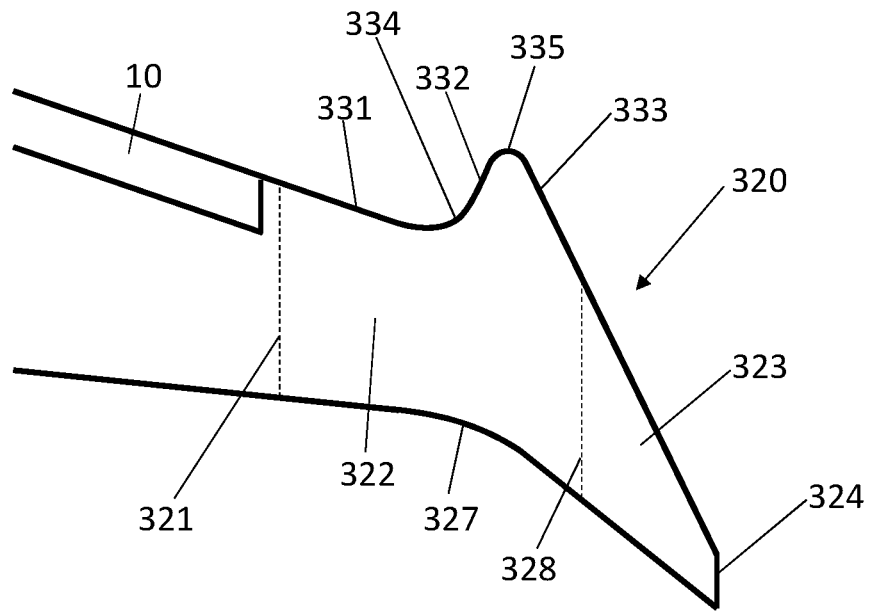
FIG. 11 is a plan view of a third example of the wing tip device having an alular-like projection with a smooth crest.

In a third example shown in FIG. 11 the wing tip device has a modified alular-like projection as compared with the first example. Like reference numerals are used to denote like parts with the first example, and similar reference numerals but numbered in the 300 series are used to denote similar parts with the first example. In the third example the second leading edge region 332 and the third leading edge region 333 are joined by a smooth leading edge crest 335. The alular-like projection functions much as in the first example. The third example may also feature the modified trailing edge of the second example.

Figure 12:
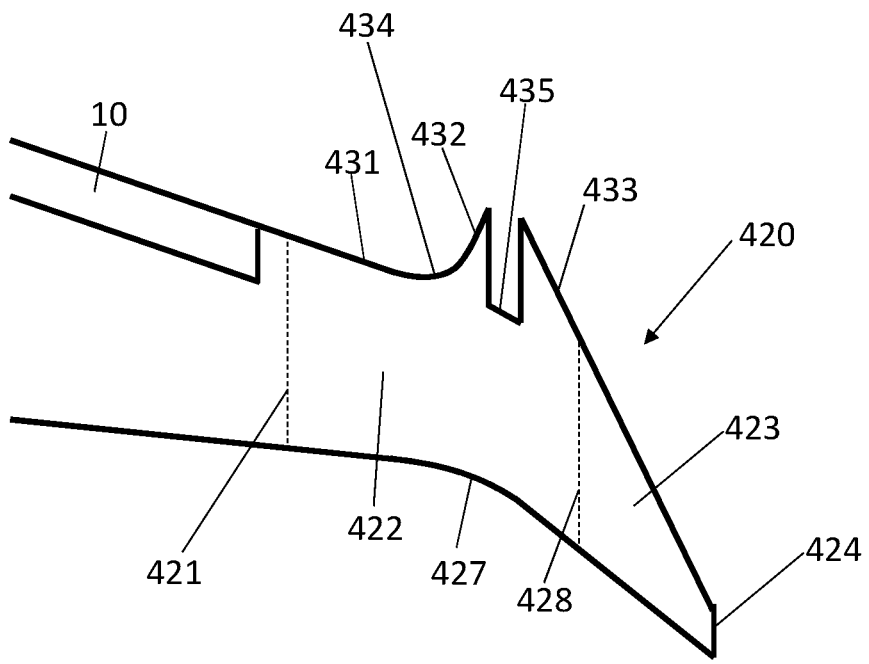
FIG. 12 is a plan view of a fourth example of the wing tip device having a re-entrant leading edge region.

A fourth example, shown in FIG. 12, has a modified alular-like projection as compared with the first example. Like reference numerals are used to denote like parts with the first example, and similar reference numerals but numbered in the 400 series are used to denote similar parts with the first example. In the fourth example the second leading edge region 432 and the third leading edge region 433 are joined by a short notched or re-entrant leading edge region 435. The alular-like projection functions much as in the first example. The notched/re-entrant region may assist with maintaining the shock location similar as if the alular-like projection were not present but without modifying the trailing edge as in the second example. However, a modified trailing edge similar to the second example may also be used with the fourth embodiment.

Figure 13A:
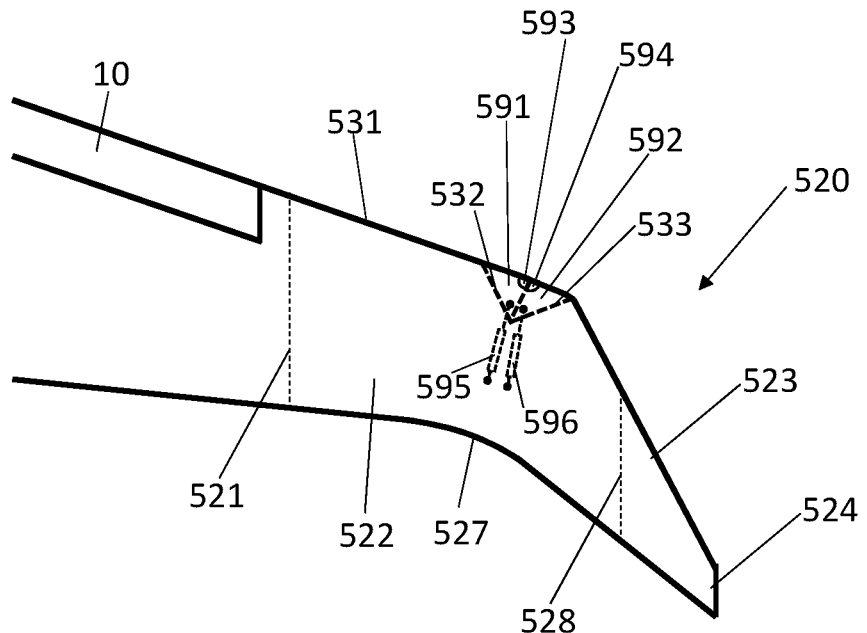
FIG. 13a is a plan view of a fifth example of the wing tip device shown in a retracted state.
Figure 13B:
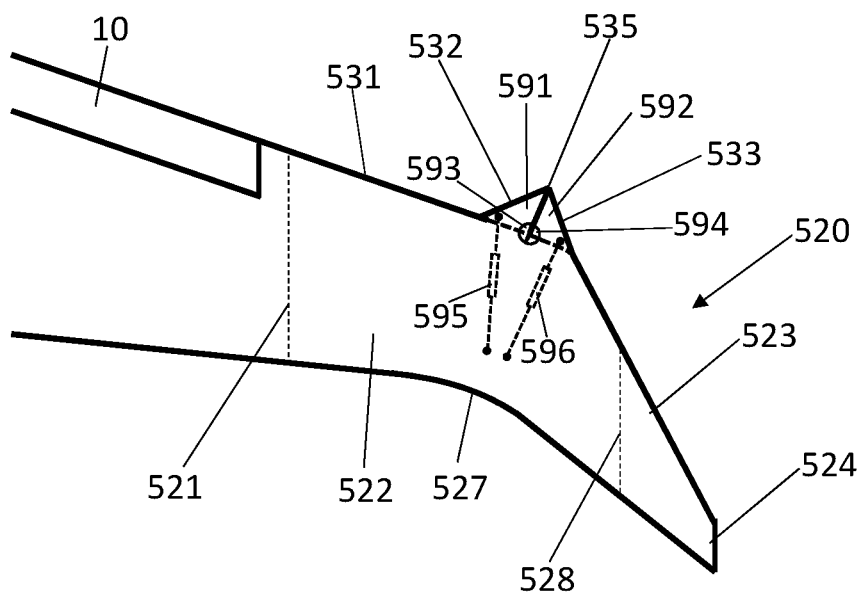
FIG. 13b is a plan view of the fifth wing tip device of FIG. 13a shown in a deployed state.

In a fifth example, shown in FIGS. 13a-b, the alular-like projection is formed of first 591 and second 592 active control surfaces that are actuated between a non-deployed phase (FIG. 13a) and a deployed phase (FIG. 13b). Like reference numerals are used to denote like parts with the first example, and similar reference numerals but numbered in the 500 series are used to denote similar parts with the first example.

In the non-deployed state the first active control surface 591 and second active control surface 592 are stowed inside the wing tip device 520 so that the first 532 and second 533 leading edge regions of the alular-like projection are not exposed. In this case there is minimal impact in the high speed, low alpha condition as compared with the wing tip device of FIG. 2.

At a higher angle of attack the control surfaces 591, 592 are actuated to a deployed state so that the first 532 and second 533 leading edge regions form an alular-like projection on the outer aerodynamic surface with a sharp leading edge cusp 535.

In the deployed state the alular-like projection functions similarly to that described in the first example. The alular-like projection may alternatively be a smooth crest, and may feature a modified trailing edge.

The first control surface 591 is configured to rotate about a first axis 593 using a first linear actuator 595. The second control surface 592 is configured to rotate about a second axis 594 using a second linear actuator 596.

The drag penalty of the wing tip device 520 is minimised in the non-deployed state. At higher angles of attack, at low speed, the control surfaces 591, 592 can be deployed to mitigate an advancing tip vortex across the leading edge 531.

The actuator is shown to be a linear actuator, however it will be clear to the skilled person that the linear actuator may be any other suitable type of actuator, such as a rotary actuator. The actuator may an electric actuator, pneumatic actuator, or other similar actuator known to the skilled person.

In the examples, the third leading edge region 133, 233, 333, 433, 533 is shown to extend in a generally straight line towards the tip end of the wing. In each example it will be clear that the third leading edge region may alternatively adopt different shape outboard of the stabilised vortex. The third leading edge region may be curved or rounded outboard of the stabilised vortex.

The wing tip devices of the examples include a winglet. Each example may alternatively feature a raked wing tip.

The first vortex 173 is described as being weaker than the second vortex 174 due to the smaller size of the second leading edge region 132 in comparison to the third leading edge region 133. However it will be clear to the skilled person that the first vortex 173 may be equally as strong as the second vortex 174, or stronger than the second vortex 174, if the respective lengths of the second 132 and third 133 leading edge regions are reconfigured.

It will be clear to the skilled person that many of the features described in relation to each example would be equally applicable to other examples. For instance, the re-entrant region of the fourth examples may be equally applicable to the deployed configuration of the fifth example.

The modified trailing edge of the second example may extend over a portion of the winglet 223, and/or may extend over a region of the trailing edge at the same spanwise location as the first leading edge region 231. Alternatively it may extend only at the same spanwise location as the second leading edge region 232 and/or third leading edge region 233.

It will be clear to the skilled person that each of the examples may include the modified trailing edge of the second example.

Figure 14A:
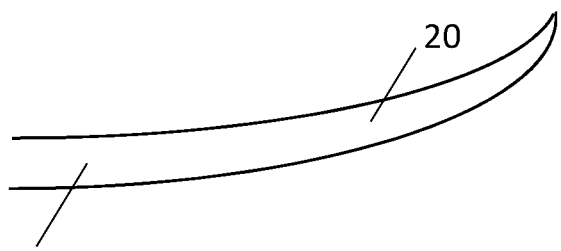
FIG. 14a shows a view looking aft of the wing tip device according to any of the first to fifth examples.
Figure 14B:
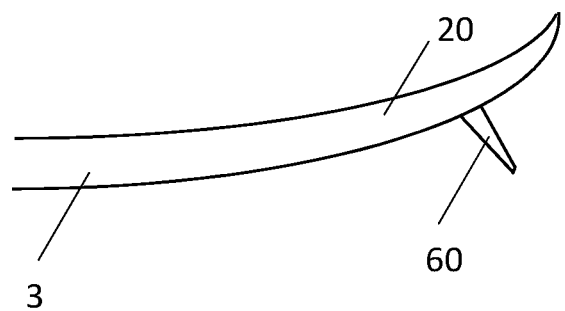
FIG. 14b is a view looking aft of a variant with a downlet.

FIG. 14a shows a view looking aft of the wing 3 having the wing tip device 20 (or any of the wing tip devices described above). The wing tip device 20 is smoothly blended into the wing 3 so as to form a continuously upwardly extending winglet profile. In this case, the first second and third leading edge regions lie on a single continuous line. However, it will be appreciated that the wing or wing tip device may have a kink so that the first second and third leading edge regions lie on a single line that is discontinuous. FIG. 14b shows a further variant that may be applied to any of the above described examples in which the wing tip device 20 further includes a downlet 60, or downwardly extending winglet. The first second and third leading edge regions are all located on the upwardly extending portion of the wing tip device 20.

Figure 14C:
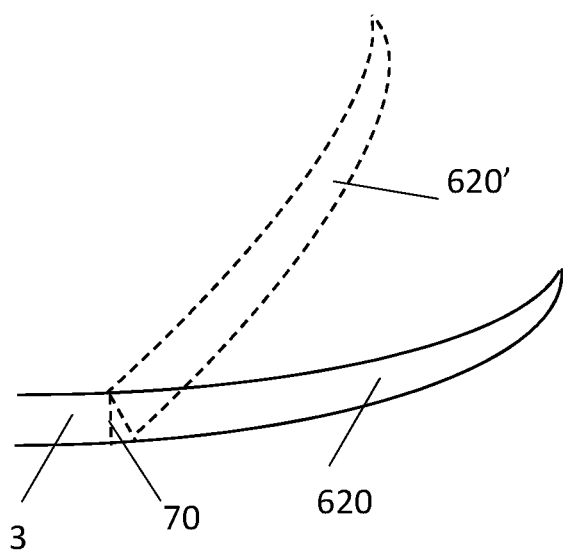
FIG. 14c shows a view looking aft of a variant with a folding wing.

The alular-like projection may also be suitable on a wing tip device for a wing with a folding wing tip. As shown in FIG. 14c a portion of the outer wing and the wing tip device may be arrange to rotate about a hinge line 70 between a planar configuration 620 for flight and an upwardly rotated position 620' on the ground for meeting airport gate limits or other span constraints.

It may be preferable to avoid having leading edge moveable high lift devices, e.g. slats, outboard of the hinge-line of the folding wing tip and so the alular-like projection provides a passive means of protecting (from stall) the outboard portion of the wing leading edge outboard of the hinge-line. The alular-like projection may allow the hinge-line of the folding wing tip to be moved further inboard, whilst still terminating the leading edge moveable high lift devices inboard of the hinge-line, so that a larger proportion of the aircraft wingspan can be folded.

The alular-like projection may be used on an aft swept or forward swept wing. On a forward swept wing the second and third leading edge regions would function similarly to that shown in the previous examples so that the second leading edge region may be forward swept at a sweep angle of at least 35 degrees and the third leading edge region may be aft swept at a sweep angle of at least 35 degrees. The first leading edge region may be swept forward and substantially match the sweep angle of the main wing portion and may have a sweep angle of up to 30 degrees.

The concave portion 129 of the lower aerodynamic surface of the first examples may extend across a part of the leading edge of the winglet 123 and/or a part of the first leading edge region 131. Alternatively the concave portion 129 may extend across only part of the second 132 and/or third 133 leading edge regions.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A wing tip device, or a wing having a wing tip device, for a fixed wing aircraft, comprising:
    a first leading edge region having a first sweep angle,
    a second leading edge region outboard of the first leading edge region in a spanwise direction and having a second sweep angle smaller than the first sweep angle, wherein the first leading edge region is blended into the second lead edge region by a concave junction,
    a third leading edge region outboard of the second leading edge region in the spanwise direction and adjacent a tip end of the wing tip device, and having a third sweep angle greater than the first sweep angle,
    wherein the second leading edge region is adapted to generate a first vortex, and
    wherein the third leading edge region is adapted to generate a second vortex which builds towards the tip end of the wing tip device,
    wherein a trailing edge of the wing tip device includes a convex portion, and
    wherein the third leading edge connects a portion of the concave junction with the convex portion by a tip end and the second leading edge region of the wing tip device.

2. A wing tip device or a wing according to claim 1, wherein the first, second and third leading edge regions are located along a single line when the wing tip device is viewed in the aircraft longitudinal direction.

3. A wing tip device or a wing according to claim 1, wherein the first leading edge region and the second leading edge region are opposing.

4. A wing tip device or a wing according to claim 1, wherein the first leading edge region is substantially straight.

5. A wing tip device or a wing according to claim 1, wherein the first sweep angle is at least 20 degrees.

6. A wing tip device or a wing according to claim 1, wherein the second and third sweep angles are each at least 35 degrees.

7. A wing tip device or a wing according to claim 1, wherein the second leading edge region is forward swept.

8. A wing tip device or a wing according to claim 1, wherein the third leading edge region is aft swept.

9. A wing tip device or a wing according to claim 1, wherein a chord length of the wing tip device in the second leading edge region increases in the outboard spanwise direction.

10. A wing tip device or a wing according to claim 1, wherein a chord length of the wing tip device in the third leading edge region decreases in the outboard spanwise direction.

11. A wing tip device or a wing according to claim 1, wherein a trailing edge of the wing tip device includes a convex portion.

12. A wing tip device or a wing according to claim 11, wherein the convex portion is at substantially the same spanwise location as the second and/or third leading edge regions.

13. A wing tip device or a wing according to claim 1, wherein the second leading edge region is inboard of the tip end of the wing tip device in the spanwise direction.

14. A wing tip device or a wing according to claim 1, wherein the second leading edge region is blended into the first leading edge region.

15. A wing tip device or a wing according to claim 1, wherein the second leading edge region extends up to the third leading edge region.

16. A wing tip device or a wing according to claim 15, wherein the second leading edge region and the third leading edge region meet to form a sharp leading edge cusp.

17. A wing tip device or a wing according to claim 15, wherein the second leading edge region and the third leading edge region meet to form a smooth leading edge crest.

18. A wing tip device or a wing according to claim 1, wherein the second leading edge region and the third leading edge region are separated by a notched leading edge region.

19. A wing tip device or a wing according to claim 1, wherein a lower aerodynamic surface of the wing tip device and/or wing includes a concave portion adjacent the leading edge.

20. A wing tip device or a wing according to claim 19, wherein the concave portion of the lower aerodynamic surface is provided in an aerofoil section that includes the second leading edge region or the third leading edge region.

21. A wing tip device or a wing according to claim 1, wherein the second leading edge region and/or the third leading edge region is moveable between a retracted and a deployed state.

22. A wing tip device or a wing according to claim 1, wherein the second and/or third leading edge regions are fixed.

23. A wing tip device or a wing according to claim 1, wherein the wing tip device further comprises a downlet.

24. A wing tip device, or a wing according to claim 1, wherein the wing tip device or wing comprises an alular-like projection.

25. A wing according to claim 1, wherein the wing has a root end, a tip end, and a leading edge high lift device extending outboard in the spanwise direction up to adjacent the tip end of the wing.

26. A wing according to claim 1, wherein the wing has a root end and a tip end, the wing tip device is coupled to the tip end of the wing, and the wing has a hinge intermediate the root end and the tip end for folding the tip end of the wing.

* * * * *